Patented Apr. 9, 1940

2,196,670

UNITED STATES PATENT OFFICE 2,196,670

PROCESS FOR MANUFACTURING VISCOUS PRODUCTS SUITABLE FOR LUBRICATION

Egon Eichwald, Amsterdam, Netherlands, assignor to Shell Development Company, San Francisco, Calif., a corporation of Delaware No Drawing. Application September 27, 1937, Serial No. 165,925. In the Netherlands October 1, 1936

5 Claims. (Cl. 87—9)

This invention relates to a process for manufacturing viscous products which are suitable for lubrication.

It is known that by polymerization of certain fatty oils, viz. those of semi-drying, poorly drying or non-drying character, with the aid of boron fluoride as a catalyst, products are obtained which are particularly suitable to be used as such as lubricants, or to be applied as additions to lubricants such as lubricating oils and greases. These types of products are known to be three dimensional homologous polymers of the fatty oils from which they were produced. (Bradley, Ind. Eng. Chem. vol. 29, pages 440–446.) The said polymerization products, in fact, not only possess in themselves a high viscosity and a flat viscosity-temperature curve, but by the addition of the said products, in some cases even in relatively small quantities, to, say, mineral lubricating oils having a low viscosity index, oils with a considerably higher viscosity index can be obtained.

The polymerization products obtained by the above known process as a rule consist of mixtures of polymerisates of fairly divergent degrees of polymerization and it has been found that, according as the polymerization treatment has been more intensive, such with a view to obtaining products having a more pronounced viscosity-index increasing effect, there are formed as a result products of such a high degree of polymerization that they have become insoluble or poorly soluble in lubricating oils.

Thus when polymerizing, for example, rapeseed oil by means of boron fluoride to highly viscous products having a viscosity-raising coefficient V. H. C. of about 1 or higher, the products obtained possess an insufficient solubility in high-grade lubricating oils, such as oils refined by extraction with selective solvents, Pennsylvanian oils and synthetic oils although it is known that such polymers having V. H. C.'s above 1 and up to 1½ and 2 are soluble in low V. I. mineral lubricating oils having V. I.'s below about 40.

The viscosity raising coefficient V. H. C. is a unit for measuring the degree of polymerization of fatty oil polymerization products. For the determination of this coefficient the degree of polymerization of a polymer which is produced by electrical voltolization of rapeseed oil and which, when added in a concentration of 6% to a viscous hydrocarbon oil having a viscosity of about 280 Saybolt at 50° C., raises this viscosity to 444.5 Saybolt at 50° C., is taken as unit. The coefficient is calculated according to $$V.\ H.\ C. = \frac{(\log V_E - \log V_A)}{6} \cdot K$$

in which equation $V_E$ is the Saybolt viscosity at 50° C. of a 6% solution of polymer in viscous hydrocarbon oil having at 50° C. a viscosity of about 280 Saybolt and a viscosity index of about 40, and $V_A$ is the Saybolt viscosity at 50° C. of the viscous hydrocarbon oil, whilst K is a constant which is calculated according to $$\frac{(\log V_e - \log V_A)}{6} \cdot K = 1$$

wherein $V_e$ is the Saybolt viscosity at 50° C. of a 6% solution of the above voltolized rapeseed oil in the hydrocarbon oil employed, from which follows a value for K of 29.54.

Now according to my invention viscous products are obtained which consist of polymers of less widely divergent degrees of polymerization, to which it may be ascribed that in this case, upon the polymerization being carried on further, the formation of insoluble or poorly soluble polymerization products need not or not so soon be feared as in the case of the known process. I have found that such more homogeneous and readily soluble polymerization products are obtained by taking as initial materials for the polymerization not or not exclusively glycerol esters, but certain esters of monohydric or dihydric alcohols, to wit esters of unsaturated aliphatic acids and monohydric or dihydric aliphatic alcohols, either saturated or unsaturated, which preferably do not contain a vinyl group.

It was found to be of particular advantage to subject the esters, in combination with semi-drying, poorly drying or non-drying fatty oils, to polymerization, either by means of boron fluoride or by voltolization. The resulting products were found not to consist exclusively of polymers of the separate components, but to contain also interpolymerization products of both components, and it appeared possible in this manner to obtain products which are not only very homogeneous, but which possess a higher degree of polymerization than those obtained by polymerization of the esters as such.

The process according to the invention, therefore, comprises the production of viscous products by polymerization of esters of unsaturated aliphatic acids and mono- or dihydric, saturated or unsaturated, aliphatic alcohols in admixture with semi-drying, poorly-drying or non-drying fatty oils by means of boron fluoride or by electrical voltolization.

Just as in the known process for polymerizing fatty oils with boron fluoride, the quantities of boron fluoride applied in the present process, when carrying out the polymerization catalytically, are also preferably small. The said quantities lie generally below 10% by weight, and are preferably smaller than about 5% by weight, for example 1 to 3% by weight, calculated on the material to be treated, whilst the polymerization temperature generally ranges between about 70° and 100° C., depending on the nature of the material to be polymerized.

The fact that when polymerizing an ester of a monovalent or divalent alcohol together with a fatty oil, e. g. rapeseed oil, in accordance with the present process, more readily soluble and yet highly viscous polymerization products are obtained than by polymerization of the fatty oil as such, is probably to be ascribed to the fatty oil, when mixed with the ester, being prevented from polymerizing three-dimensionally, a two-dimensional polymerization taking place, whereby polymerization products having branches lying in a plane are formed, which products are more homogeneous and more readily soluble than three-dimensional polymers with the same viscosity-raising coefficient, such as are obtained by polymerization of fatty oils as such.

The polymerization products obtained may be washed with solvents such as aliphatic alcohols and/or ketones having less than five carbon atoms, with a view to reducing the content of free organic acids possibly formed during the polymerization, the operation being preferably carried out at a temperature not exceeding about 60° C. when use is made of alcohols. In this case the polymerizate can be previously dissolved, for instance by taking it up in benzene. Further in the case of polymerization products obtained with the aid of boron fluoride as catalyst, the latter can be substantially removed by treating the polymerization products either dissolved or not with an aqueous liquid such as water, alcohol of 50% concentration or acetone of 50% concentration or if desired by applying combinations of such treatments.

The viscous products obtained according to my invention may be mixed up with a lubricating oil or grease, as a result of which their stability is increased. In fact, the polymerization products are then preservable to an unlimited extent and can easily be stored as such, or marketed for use as additions to lubricating oils or greases in order to improve the properties thereof.

When carying out the polymerization catalytically the boron fluoride may be applied in a gaseous state, in the form of its double compounds, such as $BF_3 \cdot HF$, $BF_3$-acetic acid, $BF_3$-ether, $BF_3$-ethyl alcohol and the like, or dissolved in substances such as nitrobenzene.

My process is further illustrated by the following examples.

Example I

A mixture of 85 parts by weight rapeseed oil, 15 parts by weight sunflower oil and 33 parts by weight of an ester of oleyl alcohol and fatty acids, obtained by esterification of sunflower oil, was submitted together with 2% by weight boron fluoride, to a polymerization treatment for 340 hours at 80° C. The polymerizate obtained was washed with alcohol of 50% concentration.

6% by weight of the purified product was dissolved in an Edeleanu raffinate of a Venezuelan distillate lubricating oil with a viscosity $E_{50}=8.14$, as a result of which the viscosity $E_{50}$ became equal to 15.3 and the V. I. increased from 40 to 98.

Moreover 6% by weight was entirely soluble in a synthetic oil obtained by polymerization of olefines, in contradistinction to a polymerizate with an equal viscosity-increasing capacity but obtained from a mixture of 85 parts by weight rapeseed oil and 15 parts by weight sunflower oil, or even from pure rapeseed oil, which, it is true, could be wholly dissolved by heating but showed flocculation on being left alone for some time.

Example II 4.4 kg. ethylene oxide and 30 kg. fatty acids from sunflower oil were heated in an autoclave for 15 hours to 140° C. After cooling 26 kg. fatty acids were added, whereupon the mixture was heated to a temperature of 190–195° C. Nitrogen was passed through at this temperature for 16 hours, as a result of which esterification took place.

At the end of this procedure the excess acid was washed out with alcohol of 96% concentration. 3% by weight of boron fluoride was then introduced into the purified product, whereupon polymerization was caused to take place for 240 hours at 80° C. The boron fluoride was washed out with alcohol from the reaction product.

6% by weight of the product obtained was added to a Venezuelan lubricating oil with a viscosity $E_{50}=8.22$ and a V. I.$=+40$. The viscosity $E_{50}$ was thereby increased to 10.61 and the V. I. to $+81$.

Example III

The following mixture was polymerized for 360 hours at 80° C. with 3% by weight boron fluoride, viz.:

| | Per cent by weight |
|---|---|
| Rapeseed oil | 65 |
| Sunflower oil | 10 |
| Amyl ester of fatty acids | 25 | from sunflower oil (made of amyl alcohol and fatty acids from sunflower oil, with 2% by weight HCl as catalyst).

After the product had been washed with alcohol and dried by evaporation a 6% solution thereof in a Venezuelan oil according to Example II showed a viscosity $E_{50}=10.2$ and a V. I.$=77$.

Example IV

A mixture of 65% by weight rapeseed oil, 25% by weight ester of oleyl alcohol and fatty acids from sunflower oil and 10% by weight of sunflower oil (the latter serving to accelerate the polymerization) was polymerized with 2% by weight boron fluoride during 200 hours at 80° C. A polymerization product having a viscosity-raising coefficient of 0.98 and a saponification value of 156 was obtained.

This polymerization product, which was very readily soluble in synthetical lubricating oil obtained by polymerization of crack gasoline, was split up by extraction with a mixture of equal parts of acetone and methyl ethyl ketone into 60% of an extract having a viscosity-raising coefficient of 0.62 and a saponification value of 155 and 40% of a residue with a viscosity-raising coefficient of 1.30 and a saponification value of 159. 6% of both the extract and the residue were very readily soluble in synthetical lubricating oil, no precipitate being formed in the solutions even after about one year's standing.

When polymerizing rapeseed oil itself under the same conditions, a polymerization product with a viscosity-raising coefficient of 0.90 and a saponification value of 170 was obtained. No homogeneous mixture could be obtained when adding 6% of this polymerization product to the same synthetic lubricating oil as above: the polymerizate settled out after a few hours' standing. Also an extract with a viscosity-raising coefficient of 0.62 and a residue with a viscosity-raising coefficient of 1.22, obtained by extraction of the polymerization product with a mixture of equal parts of acetone and methyl ethyl ketone, when added in a quantity of 6% to the synthetic oil, settled out on being left to stand for some time.

Example V

A mixture of 75% by weight of rapeseed oil and 25% by weight of the ester of oleyl alcohol and fatty acids from rapeseed oil was voltolized during 9 hours at about 95° C. under a pressure of 30 mm. mercury. The tension amounted to 3.8 kv., the frequency to 7500 periods and the current density to 75 ma.

The product was then mixed with an equal amount of Pennsylvanian lubricating oil and voltolized during 16.5 hours at about 95° C. under a pressure of 30 mm. mercury, the tension being 3 kv., the frequency 7500 periods and the current density 50 ma.

The resulting mixture was admixed with an equal part of the same lubricating oil as above and again voltolized this time for 28 hours at about 95° C. under a pressure of 30 mm. mercury with a tension of 3 kv., a frequency of 7500 periods and a current density of 50 ma.

The product finally obtained was an oil with a viscosity-raising coefficient of 1.12. This product, when added in an amount of 10 to 20% to a synthetic or Pennsylvanian lubricating oil, yielded a clear solution which did not settle out, even after being kept for a long period of time at −10° C.

I claim as my invention:

1. In a process for producing viscous polymerization products soluble in mineral lubricating oils and suitable for lubrication by polymerization of a semi-drying fatty oil at a temperature between 70 and 100° C. by means of boron fluoride, the improvement comprising polymerizing said fatty oil in the presence of an ester formed by reacting an unsaturated aliphatic acid and an aliphatic alcohol containing not more than 2 hydroxy groups.

2. The process of claim 1 in which the quantity of boron fluoride is below 5% by weight of the mixture treated.

3. The process of claim 1 in which the ester is an ester of an unsaturated aliphatic acid and an aliphatic alcohol containing not more than 2 hydroxy groups and no vinyl group.

4. The process of claim 1 in which the ester is an ester of a high molecular weight unsaturated fatty acid and saturated aliphatic alcohol.

5. The process of claim 1 in which the ester is an ester of an unsaturated fatty acid and a high-molecular weight aliphatic alcohol.

EGON EICHWALD.